Figure 1:
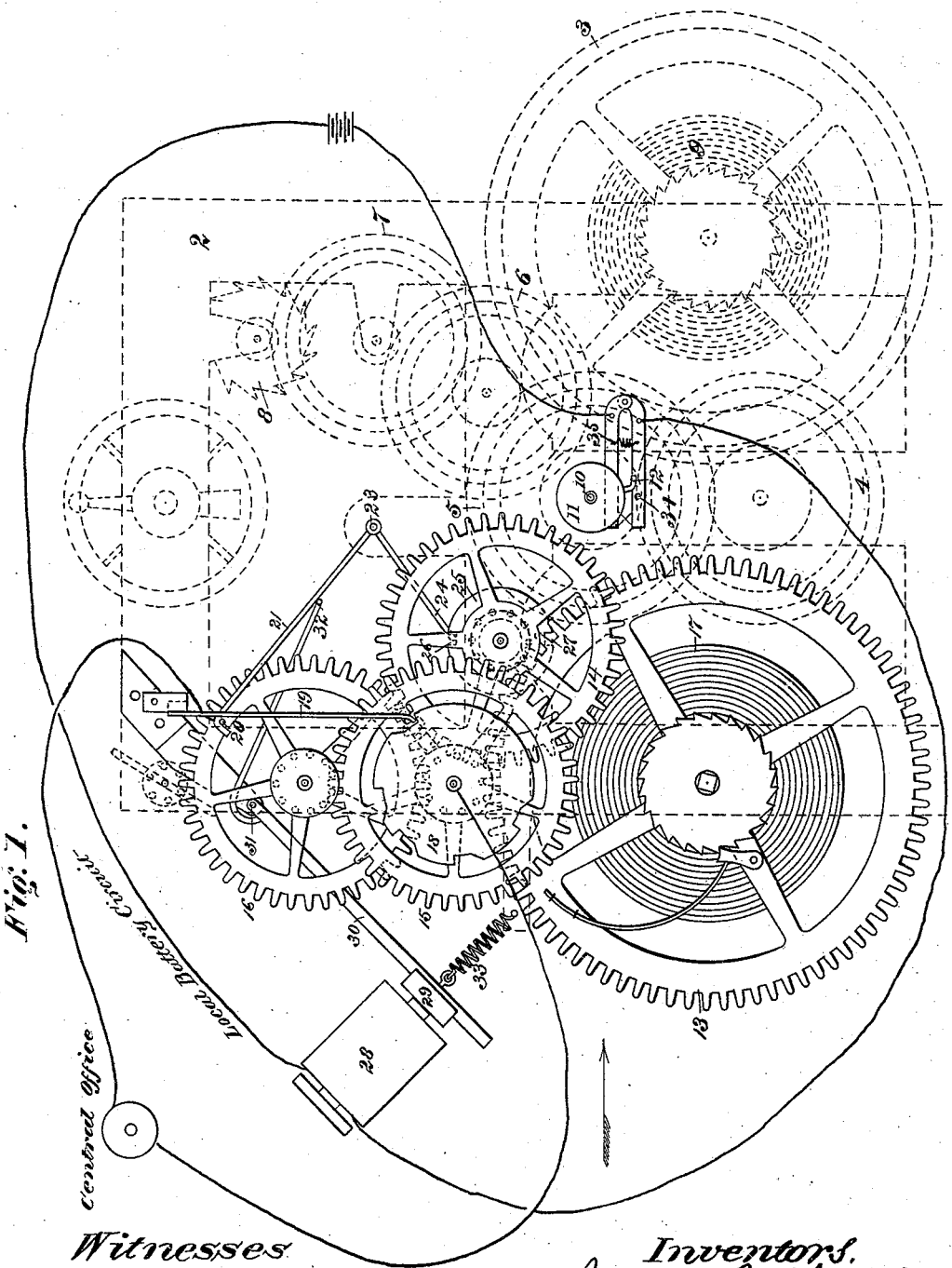

(No Model.) 5 Sheets—Sheet 1.

J. B. YEAKLE & A. STEUART.
ELECTRIC BURGLAR ALARM.

No. 370,439. Patented Sept. 27, 1887.

Witnesses
Edward A. Osse,
J. K. E. Diffenderffer.

Inventors.
James B. Yeakle
Arthur Steuart
by Price & Steuart
their Attorneys.

(No Model.) 5 Sheets—Sheet 2.
J. B. YEAKLE & A. STEUART.
ELECTRIC BURGLAR ALARM.
No. 370,439. Patented Sept. 27, 1887.
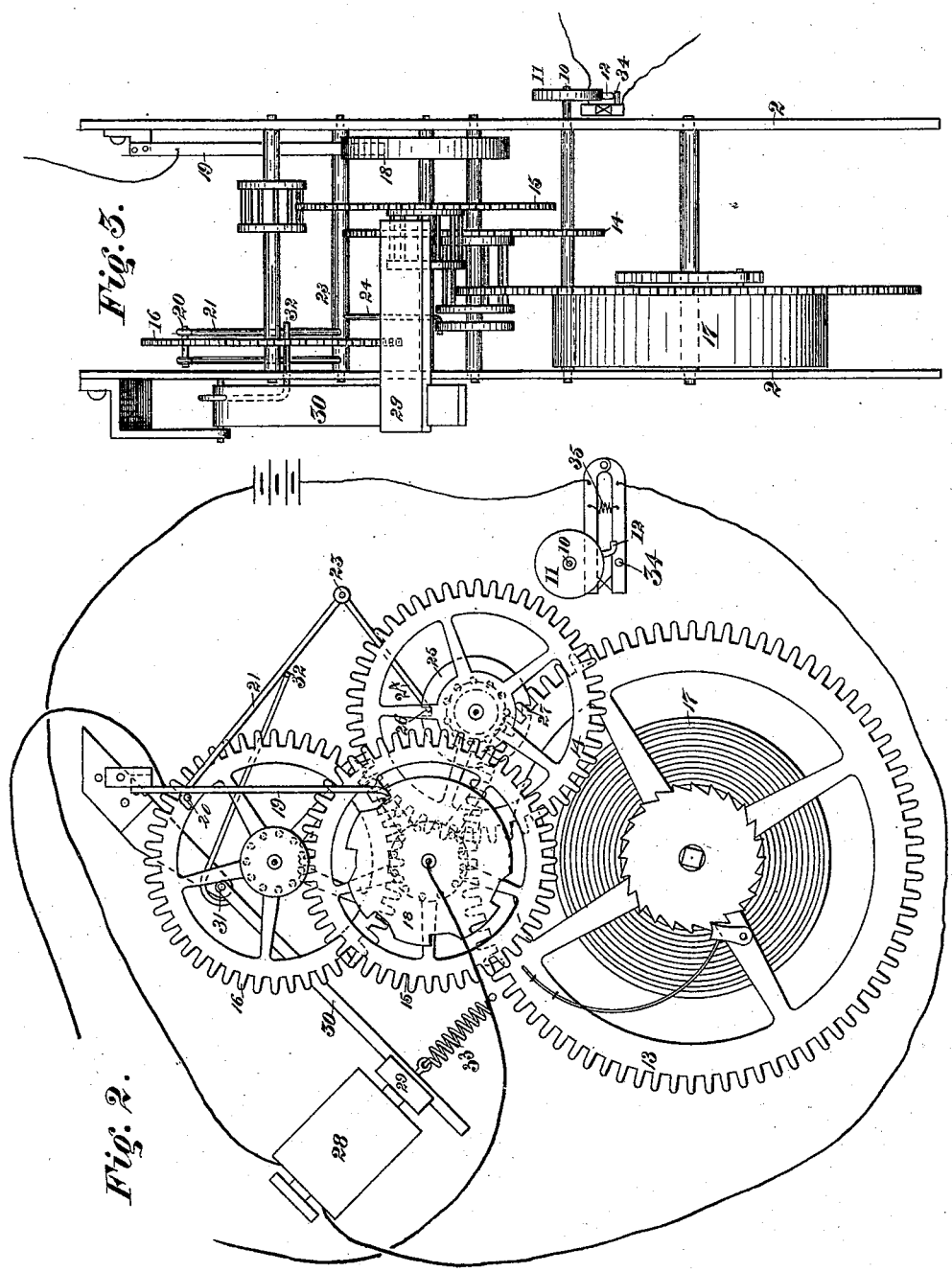

(No Model.) 5 Sheets—Sheet 3.
J. B. YEAKLE & A. STEUART.
ELECTRIC BURGLAR ALARM.
No. 370,439. Patented Sept. 27, 1887.
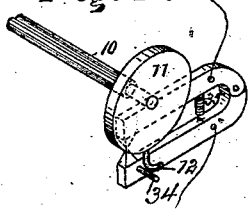
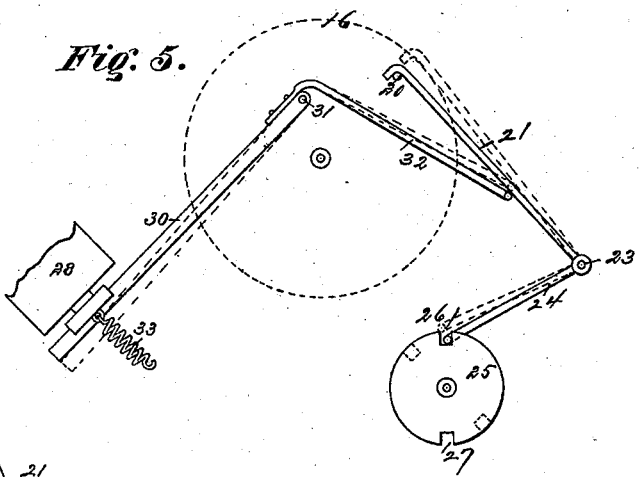
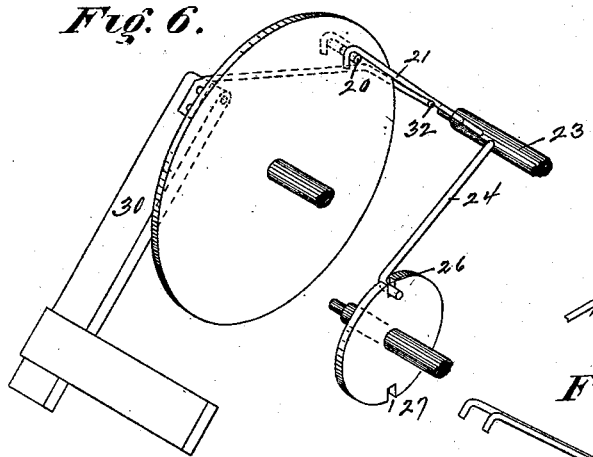
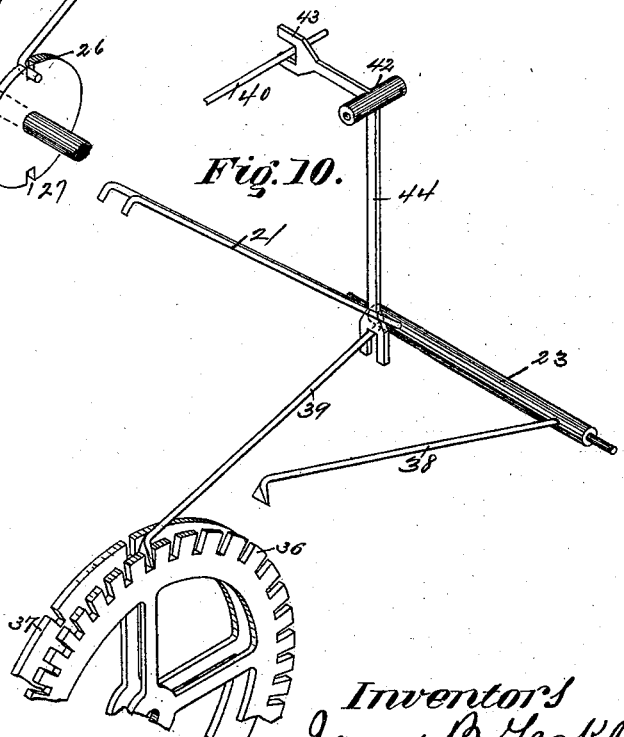
Witnesses
Inventors
James B. Yeakle
Arthur Steuart
by Price & Steuart
Attorneys (No Model.) 5 Sheets—Sheet 4.

J. B. YEAKLE & A. STEUART.
ELECTRIC BURGLAR ALARM.

No. 370,439. Patented Sept. 27, 1887.

Witnesses:
Edward A. Osse,
J. K. E. Diffenderffer.

Inventors
James B. Yeakle
Arthur Steuart
by Price & Steuart
their Attorneys (No Model.) 5 Sheets—Sheet 5.

J. B. YEAKLE & A. STEUART.
ELECTRIC BURGLAR ALARM.

No. 370,439. Patented Sept. 27, 1887.

Witnesses
Edward A. Osse,
J. K. E. Diffenderffer.

Inventors
James B. Yeakle
Arthur Steuart
by Price & Steuart
their Attorneys

N. PETERS, Photo-Lithographer, Washington, D. C.

UNITED STATES PATENT OFFICE.

JAMES B. YEAKLE AND ARTHUR STEUART, OF BALTIMORE, MARYLAND.

ELECTRIC BURGLAR-ALARM.

SPECIFICATION forming part of Letters Patent No. 370,439, dated September 27, 1887.

Application filed November 15, 1886. Serial No. 218,843. (No model.)

*To all whom it may concern:*

Be it known that we, JAMES B. YEAKLE and ARTHUR STEUART, both of the city of Baltimore, and State of Maryland, have invented certain new and useful Improvements in Automatic Electric Burglar-Alarm Apparatus, of which the following is a specification, reference being had to the accompanying drawings.

Our invention relates to electric burglar-alarms of the class in which one or more circuit-breaking devices located at different points to be guarded are in circuit with one another and with an electric-alarm apparatus located at a distance; or the apparatus may be used on an independent line.

The object of our improvement is to cause an alarm at a central office or other distant place whenever premises guarded are burglariously invaded, and also to cause a signal to be given at stated intervals at the central office or other distant place, for the purpose of indicating that the local and main-line circuits and instruments are intact and operative.

The invention lies in improvements upon the apparatus and system shown and described in a patent of the United States, granted to James B. Yeakle on December 8, 1885, No. 332,130, for automatic circuit-breakers for burglar-alarms; and it consists of an arrangement of old and novel devices by which the local circuit used for lacing a vault or building can be automatically broken and re-established at predetermined intervals, so that every time a testing-signal is sent to the central office or other distant point it will indicate that the whole line and all the apparatus in or connected with the circuit are operative and in good condition. These objects are accomplished by the device hereinafter described.

Figure 7:
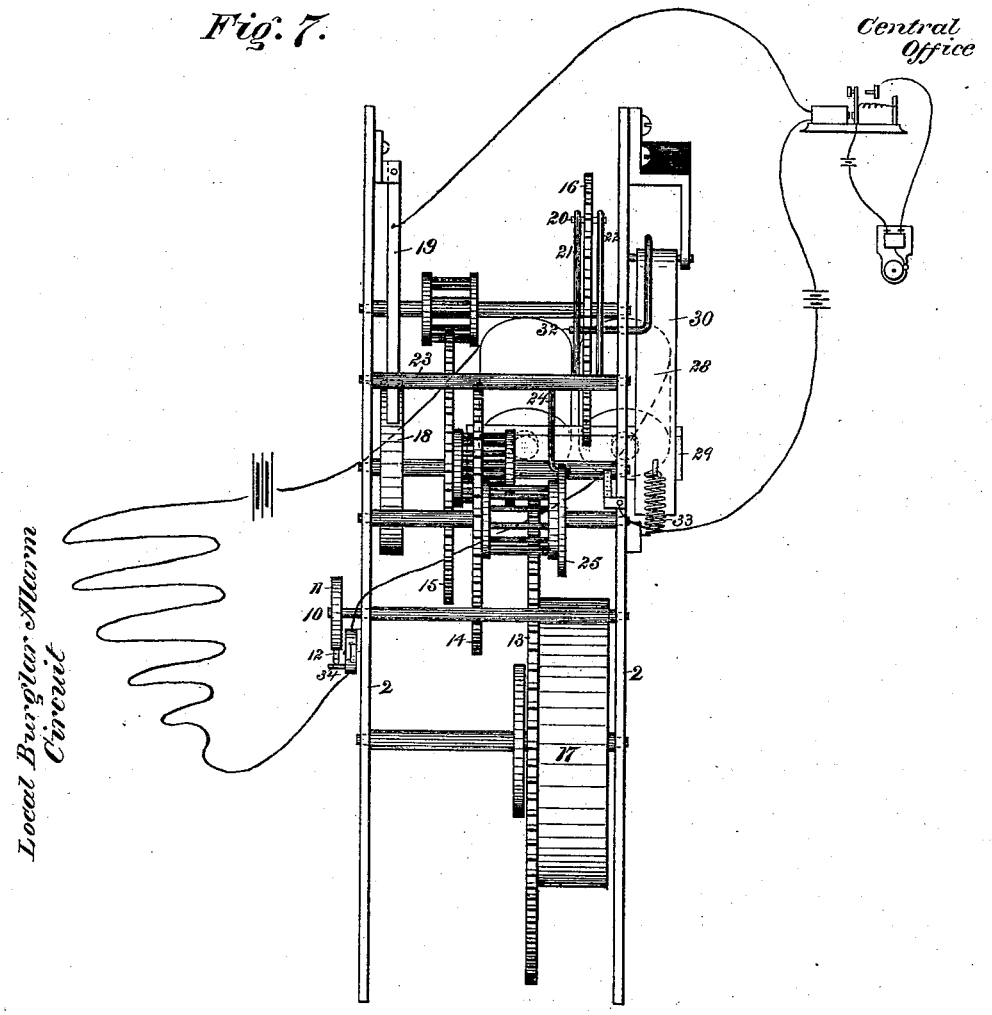
Figure 9:
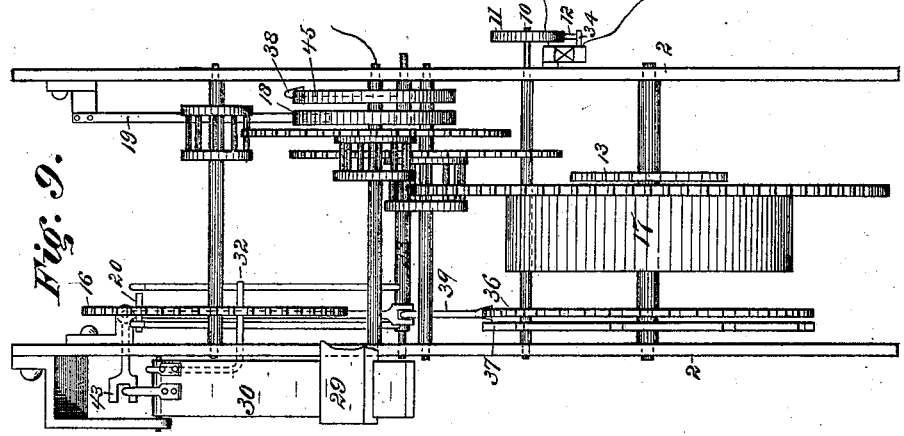
Figure 8:
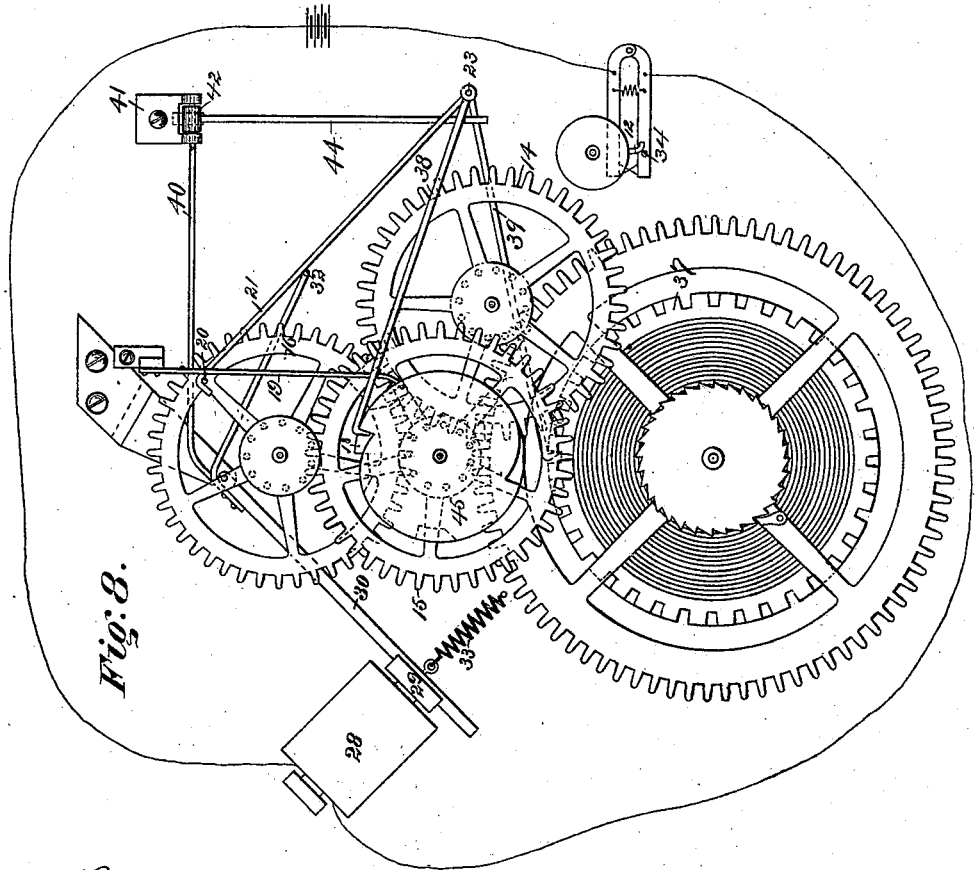

In the drawings, Figure 1 is a front elevation of an automatic circuit-breaking mechanism, combined with a local circuit which contains a circuit-breaker, connected to which is a chronometer movement and an electro-magnet, the armature of which is connected with the main-line circuit-breaker by a tripping device. Fig. 2 is a side elevation, in detail, of the automatic circuit-breaker. Fig. 3 is an end elevation of the same from the direction of the arrow in Fig. 1. Fig. 4 is a perspective view of the hour-arbor and its disk and circuit-breaker or contact-points. Fig. 5 is an elevation in detail of shaft 23, with its hooks and other connections. Fig. 6 is a perspective view of the devices shown in Fig. 5. Fig. 7 is a diagram illustrating the circuit-connections of the apparatus. Fig. 8 is a side elevation of the automatic circuit-breaker, showing tripping device and notched disks. Fig. 9 is an end elevation of the same. Fig. 10 is a perspective view of the shifting shaft 23, with its hooks and the bell-crank lever for shifting it.

Referring to Fig. 1, the numeral 2 indicates a frame, in which are mounted two systems of spring-driven gear-wheels similar to the time-train and striking-train of an ordinary striking-clock. The devices corresponding to the time-train are mainly shown in dotted lines. Their use is simply to actuate a circuit-breaker at predetermined intervals to break and re-establish the local circuit, and by so doing set in motion the train corresponding to the striking-train, and we prefer to use an accurately-regulated time mechanism, substantially such as is shown in the drawings.

The wheels of the time-train are indicated by the numerals 3, 4, 5, 6, 7, and 8, and as their construction and operation are well known they need not be more particularly described. The motive-spring 9 is connected up in the usual manner. The dial-wheels are omitted, as they are not essential. The wheel 5 we will call the "hour-wheel." It is fixed upon the shaft 10, which we will call the "hour-arbor," and upon this shaft is mounted a disk, 11, provided with a projecting hook, 12, or an elevation upon its circumference. There may be two or more of these hooks or elevations upon the disk, if a half or quarter hour signal be desired. The wheels 13, 14, 15, 16 (shown in full lines) are geared in train in the usual manner, and driven by spring 17, the same as a striking-train of a clock; but instead of operating the striking mechanism they operate a circuit-breaking wheel, 18. We will refer to this train hereinafter in this specification as the "circuit-breaker train."

On the arbor of wheel 15 of circuit-breaker train this circuit-breaker 18 is mounted in the usual manner with notches or insulated sections, and provided with a metallic (usually copper) tongue or brush, 19, which is secured to the frame 2, and the free end of which rests upon the periphery of the circuit-breaker wheel 18. To this tongue is connected one pole of the main line, while the other is attached to the circuit-breaker wheel. It will be seen that when the circuit-breaker wheel is revolved the main-line circuit will be broken as often as a notch or insulated point passes below the tongue, so that a definite number of signals will be given at the central office for every revolution of the circuit-breaker wheel, which will indicate the location from whence comes the signal.

The wheel 16 has a pin, 20, passed through it near its periphery, so as to project on both sides and to hold the circuit-breaker train from running. This pin will be engaged by the detent-hooks 21 and 22, as will presently be explained. These hooks 21 and 22 project from shaft 23, mounted transversely in the frame 2 in such a manner that it can be partially revolved on its axis. Attached to and projecting downward and forward from this same shaft is a hook, 24, the end of which either rests upon the disk 25 or engages the notches 26 or 27 in said disk.

The disk 25 is mounted rigidly upon the shaft of wheel 14 of the circuit-breaker train, and is provided with one or more notches in its periphery. This train is geared in such a manner that wheel 14 will make one revolution while wheel 15 is making eight. Therefore we have provided the disk 25 with two notches, 26 and 27, diametrically opposite to one another, so that when the train is released by the hooks 21 and 22, and 24 being raised, the notch 26 will be carried beyond the hook 24 before wheel 16 shall have made a complete revolution, and will rest upon the periphery of the disk as it turns until it shall have made a half-revolution. So long as the hook 24 rests upon the periphery of the disk 25 it will keep the hooks 21 and 22 elevated to such a point that they will not engage the pin 20, and the circuit-breaker will run until the hook 24 falls into the notch 27, when, as the train is here shown, the circuit-breaker wheel will have made four complete revolutions and sent in four complete signals.

An electro-magnet or pair of electro-magnets, 28, included in a local battery-circuit, which is used for the lacing or other means of securing a vault or building, is suitably located in the vicinity of the time and circuit-breaker trains, and is provided with an armature, 29, which is attached to an armature-lever, 30, hinged to the frame 2 at 31. To this armature-lever is rigidly attached a tripping-hook, 32, which projects inward and downward toward the time-train, and is provided with a laterally-projecting hook on its extremity. When the local circuit is closed, the rods and levers will be in the position shown in Figs. 1 and 3, and the tripping-hook 32 will rest immediately below the hooks 21 and 22. In this condition the apparatus will remain stationary and the central-office bell silent so long as the local circuit remains unbroken by any exterior cause or by the time-train circuit-breaker. So soon, however, as the local circuit is broken in the lacing the electro-magnet will be demagnetized, the armature released, and the armature-lever drawn back by its retractible spring 33. The rod 32, being rigidly attached to the armature-lever, will rise and its hook will push up the hooks 21 and 22 and disengage them from pin 20. The rod 24, being also rigidly attached to shaft 23, will be raised out of engagement with the disk 25 and the circuit-breaker train released and held open to run and give a continuous signal until the local circuit be re-established. The same operation will be performed when the local circuit is broken by the time mechanism operating its circuit-breaker; but so soon as the local circuit is re-established by the passage of the hook 12 past the pin 34 the armature will be attracted by the electro-magnet, and the hooks 21 and 22 liberated, to fall upon and engage pin 20 as soon as the disk 25 has revolved the requisite distance to bring the hook 24 into the notch 27 in said disk. The circuit-breaker connected with the time-train, and shown in Fig. 4, is provided with a spring, 35, which maintains the contact between the contact-points at all times except when the end of the hook 12 strikes the pin 34, when it separates the contact-points and breaks the circuit. This breach only lasts so long as it takes for the hook 12 to pass the pin 34, when the points are brought again into contact by the spring 35 and the circuit re-established. The length of time required for the hook 12 to pass the pin 34 is less than that required for a full signal to be given, so that before one complete revolution of the main-line circuit-breaker wheel has been made the hooks 21 and 22 will be released by the tripping-hook 32; but, as above described, the position of hook 24, resting upon the periphery of disk 25, will maintain them out of engagement with pin 20 until a full signal has been given.

If several of these instruments are used on the same line, a switch may be provided by which each house or vault may be cut out of the main-line circuit, should anything go wrong with it, so as not to interfere with the other places being guarded and their instruments.

The time-train and circuit-breaker already described are provided for the purpose of breaking the local circuit automatically at predetermined intervals, so as to indicate to the watchman in charge of the central office every time the bell rings that the place guarded is not only all right, but that his apparatus is in perfect order to warn him if anything goes wrong.

The tripping device just described is especially suitable for independent lines, because it combines simplicity with the great safeguard of a continuous alarm when the local circuit is broken and not re-established. It has some disadvantages, however, when used on a circuit with several other alarms, and for use on such a circuit we have devised the following arrangement, by which we get two distinct alarms, each of a designating character, but which, after they have been given, will not interfere with the integrity of the main-line circuit, and will hence permit all the other stations or circuit-breakers on the same line to operate without interruption.

On the arbor of wheel 13, Figs. 8, 9, and 10, are rigidly mounted two disks, 36 and 37, each of which is notched in its periphery. The notches in the one next to the wheel 36 are quite close together, while those in the other, 37, are much farther apart. On the arbor of wheel 15 is rigidly mounted a lift-disk, 45, which is provided with two notches diametrically opposite to one another. One side of these notches is perpendicular and the other is inclined.

The shaft 23 is provided with elongated ends, which rest in journals and are so arranged that the shaft can be shifted in the journals from side to side. From this shaft project four hooks, 21 and 22, 38 and 39. Hooks 21 and 22 engage pin 20 in wheel 16. 38 engages the notches in the lift-disk 45. The end of this hook is flattened out, so as to be wide enough always to engage the notch whatever the position of the shaft 23 may be. 39 engages the notches in disks 36 or 37, according to the position of the said shaft.

To the armature-lever 30, at its point of attachment to the frame 2, are fastened two rods, 32 and 40, one projecting back and downward and having a laterally-projecting hook on its own end, which, when the local circuit is closed, will rest immediately beneath the hooks 21 and 22. On the inside of the frame 2 is fastened a bracket, 41, in which is mounted a bell-crank lever, 42, each end of which is provided with a fork. The fork of the horizontal end 43 engages the rod 40, and that of the perpendicular end 44 the hook 39. When the local circuit is broken and the armature-lever drawn back by its spring 33, the rods 32 and 40 will be raised. The fork 43 of the bell-crank is made wide enough to allow the rod 40 to rise somewhat before moving the bell-crank. The hook of rod 32, however, rests immediately below the hooks 21 and 22, so that so soon as the armature is released and the armature-lever drawn back by its spring the rod 32 will raise the detent-hooks 21 and 22, and also 38 and 39, by turning the shaft 23 on its axis out of engagement with the pin and disks. As the rod 40 rises farther it will strike the fork 43, raise it, and by so doing cause the fork 44 to press upon the hook 39 and shift the shaft 23 in its bearings.

From the fact that the two notched disks 36 and 37 are mounted side by side, if the hook 39 were shifted while it was engaged with one of them it might not strike a notch in the other, and would thus interfere with the operation of the apparatus. It is therefore necessary that this hook should be raised out of engagement with either disk before it is shifted. For this reason the hook of rod 32 is made to act upon the detent-hooks to raise them all before the shifting takes place. As soon as the detent-hooks are raised, the train begins to run, and before the detent-pin 20 has made one complete revolution the lift-disk 45 has turned far enough to raise the hook 38 to its periphery, and once there the shaft 23 will have been turned sufficiently to keep both hooks 21 and 22 and 39 out of engagement with the pin 20 and the notches of the disks 36 and 37. At each half-revolution of this lift-disk 45 the hook 38 will fall into a notch; but unless the hook 39 happens at the same instant to fall into a notch also, it will prevent the hooks 38 and 21 and 22 from falling, and thus the train will run until both hooks 38 and 39 fall into notches simultaneously. The notches on the disks 36 and 37 are so arranged that the distances between them will be multiples of the revolutions of the disk 45, so that when it has made the desired number of revolutions the hooks 38 and 39 will fall together into their notches and stop the train. The notches on disk 36 are much closer together than those on 37, so that while hook 39 is resting upon that disk the disk 45 will make a less number of revolutions before the train is stopped than when 39 is resting upon 37. The laterally-projecting hook of rod 32 is of such a length that when the shaft 23 and its hooks are shifted the hook 22, under which it rests, will be carried beyond the plane of its motion and can fall without touching it.

It will be seen that when the local circuit is broken and the armature-lever drawn back the hooks will be raised and shifted, so that hook 39 will stand over the disk 37, and, as before described, while it is in this position the lift-disk 45 and the main-line circuit-breaker, which is mounted on the same shaft, will make, say, ten revolutions, and give as many signals at the central office before the train is stopped by the hooks 38 and 39 falling into coincident notches in their disks 45 and 37. After giving this alarm-signal the train will remain inactive, although the local circuit be broken; but the main-line circuit will be re-established through the circuit-breaker, and the other stations operate undisturbed. When, however, a testing-signal from the local circuit-breaker is sent in and the local circuit broken, the above-described action will take place; but so soon as the local circuit is re-established the hook 39 will be shifted back so as to stand over the disk 36, and the notches in that disk being much closer together, the hook 39 will fall into one of them and stop the train when the lift-disk 45 and the main-line circuit-breaker have made, say, one revolution, and sent into the central office one signal, which is recognized as the testing-signal.

Having thus described our invention, what we claim, and desire to secure by Letters Patent, is—

1. In a burglar-alarm, the combination, with a main line connecting a distant place to be guarded with a central station, of an automatic circuit-breaker in the main circuit, an electro-magnet disconnected from the main line but included in a local-battery circuit and provided with tripping devices for tripping the main-line circuit-breaker train into action when the local circuit is broken, and a time mechanism operating a circuit-breaker in the local-battery circuit to break and re-establish the local circuit automatically at predetermined intervals, substantially as described.

2. In an automatic circuit-breaker for burglar-alarms, the combination of a time-train on the hour-arbor of which is mounted a disk provided with a hook or elevation or other equivalent device, and a pair of contact points held in contact by a spring or its equivalent, one of which is provided with a pin which engages the hook or elevation of the hour-arbor disk, to separate the contact-points as the disk is revolved, substantially as described.

3. In an electric burglar-alarm, a local-battery circuit used for the lacing, or an equivalent of the lacing, of a place to be guarded, in which is included a circuit-breaker connected with and operated by a time mechanism which acts to break the local circuit automatically at predetermined intervals, in combination with a time mechanism and a main line and means operating said main line by the devices in the local-battery circuit.

4. In an electric burglar-alarm, the combination of a local-battery circuit which forms the lacing, and in which is included a spring-contact, with a time mechanism operating said spring-contact to break and re-establish the local circuit automatically at predetermined intervals.

5. In an electric burglar-alarm, the combination of an automatic circuit-breaker train provided on one of its shafts with a break-wheel, 18, and a detent-pin, 20, projecting from one or both sides of one of the wheels of said train, a shaft, 23, mounted transversely of the frame of the circuit-breaker train, and provided with the detent-hook 21, or hooks 21 and 22 to engage said pins, the tripping-hook 32, attached to the armature-lever 31, which carries the armature to engage detent-hooks 21 and 22, and an electro-magnet included in a local-battery circuit, substantially as described.

6. In an electric burglar-alarm, the combination of the lever 30, hooks 32, 21, and 22 with the detent-pin 20 and the circuit-breaker train, as and for the purpose specified.

7. In an electric burglar-alarm, the combination of the lever 30 and rod 40, the bell-crank lever 42, provided with a fork on the end of either arm, the shifting shaft 23, having elongated bearings and arranged to shift in its journals, and provided with hook 21, or hooks 21 and 22, 38 and 39, with the circuit-breaker train, on one of the arbors of which is mounted the lift-disk 45, and on another the notched disks 36 and 37, all substantially as described.

8. In an electric burglar-alarm, an automatic circuit-breaker included in the main line, on one of the arbors of which is rigidly mounted a lift-disk having notches in its periphery, and on another two notched disks, the notches in one being closer together than in the other, in combination with the shifting shaft 23, and hooks 37, 38, and 21, or 21 and 22, and the bell-crank 42, rod 40, and armature-lever 30, actuated by spring 33, all substantially as described, as and for the purpose specified.

9. In an electric burglar-alarm, an automatic circuit-breaker included in the main line and provided with a circuit-breaker wheel constructed, as usual, on one of its arbors, and having a lift-disk mounted on the same arbor, and notched disk 37 on another arbor, in combination with the hook 21, or hooks 21 and 22 and 38 and 39, all projecting from shaft 23, and the tripping-hook 32, attached to the armature-lever 30, and arranged to trip the circuit-breaker into action when the local circuit is broken, all substantially as described, as and for the purpose specified.

10. In an electric burglar-alarm, an automatic circuit-breaker substantially such as described, provided with two notched disks mounted on one of its arbors, the notches in one disk being closer together than those in the other, said notches engaged by a detent-hook, in combination with means for tripping said circuit-breaker into action, and for shifting said detent-hook from one disk to the other, substantially as described.

JAMES B. YEAKLE.
ARTHUR STEUART.

Attest:
FELIX R. SULLIVAN,
L. RABILLON.